(12) United States Patent
Farwell et al.

(10) Patent No.: US 8,365,634 B2
(45) Date of Patent: Feb. 5, 2013

(54) UNIVERSAL ACTUATION AND CONTROL OF STEERING MECHANISMS FOR MOBILE VEHICLES

(75) Inventors: Mark L. Farwell, Colorado Springs, CO (US); Anthony Jon Feltman, Colorado Springs, CO (US); Kyle Adam Frerichs, Colorado Springs, CO (US); Todd Evan Vande Brake, Peyton, CO (US)

(73) Assignee: Exelis Inc., McLean, VA (US)

( * ) Notice: Subject to any disclaimer, the term of this patent is extended or adjusted under 35 U.S.C. 154(b) by 757 days.

(21) Appl. No.: 12/562,035

(22) Filed: Sep. 17, 2009

(65) Prior Publication Data
US 2011/0061963 A1 Mar. 17, 2011

(51) Int. Cl.
*B62D 5/00* (2006.01)
(52) U.S. Cl. .......................... 74/494; 180/444
(58) Field of Classification Search .................... 74/494; 180/444
See application file for complete search history.

(56) References Cited

U.S. PATENT DOCUMENTS

| 3,003,363 | A | * | 10/1961 | De Hart | 74/494 |
| 5,172,589 | A | * | 12/1992 | Witt | 73/132 |
| 5,372,035 | A | * | 12/1994 | Ogawa et al. | 73/118.01 |
| 5,865,266 | A | * | 2/1999 | Froelich et al. | 180/443 |
| 6,141,620 | A | * | 10/2000 | Zyburt et al. | 701/117 |
| 6,189,405 | B1 | * | 2/2001 | Yazane | 74/493 |
| 7,360,623 | B2 | * | 4/2008 | Green et al. | 180/443 |
| 7,628,239 | B1 | * | 12/2009 | Louie et al. | 180/167 |
| 8,201,474 | B2 | * | 6/2012 | Reichhardt | 74/494 |
| 2006/0149446 | A1 | * | 7/2006 | Nelson | 701/41 |

* cited by examiner

*Primary Examiner* — Kevin Hurley
(74) *Attorney, Agent, or Firm* — Edell, Shapiro & Finnan, LLC

(57) ABSTRACT

An actuation and control system for a steering mechanism of a mobile vehicle includes a motor including a drive shaft that is rotatable in two opposing directions, a securing structure configured to be secured to the steering mechanism of the mobile vehicle, and a linking structure that couples the motor with the securing structure. The system is configured such that rotational motion of the drive shaft is imparted to the securing structure to facilitate control of the steering mechanism of the mobile vehicle. The system is relatively easy to assemble and install and in a mobile vehicle and can be used with a variety of different vehicles to facilitate remote and/or unmanned navigational control of a mobile vehicle.

19 Claims, 10 Drawing Sheets

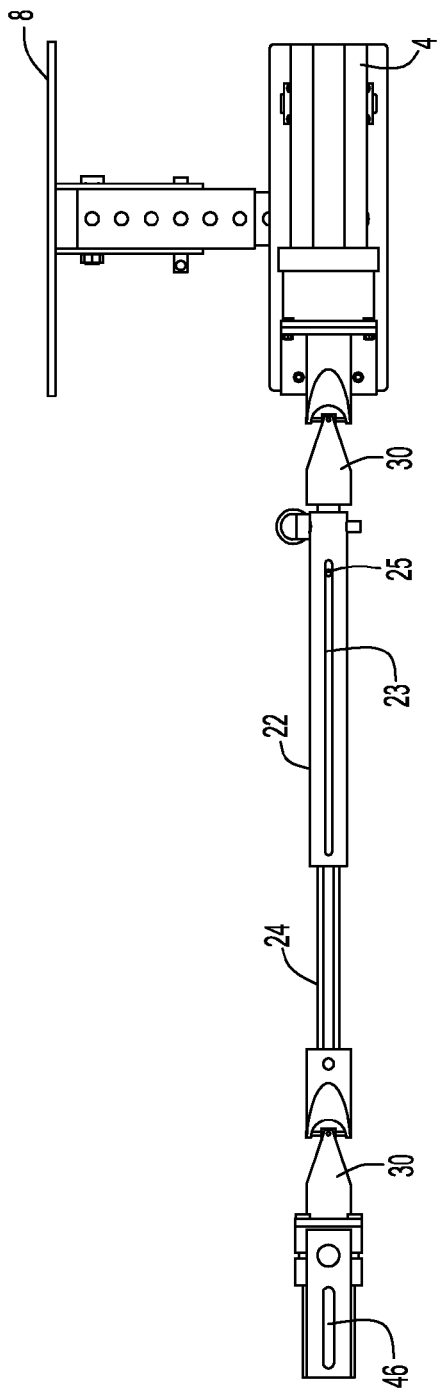
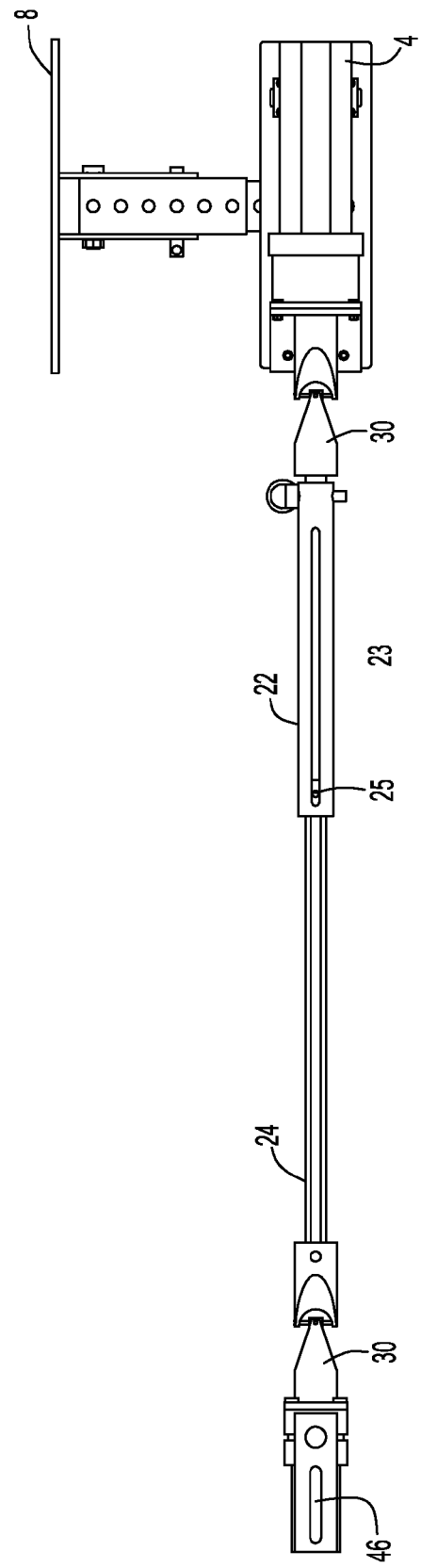

UNIVERSAL ACTUATION AND CONTROL OF STEERING MECHANISMS FOR MOBILE VEHICLES

GOVERNMENT LICENSE RIGHTS

This invention was made with U.S. Government support under W9124R-08-P-1233, and the U.S. Government has certain rights in the invention.

BACKGROUND

Remote navigational control systems of unmanned vehicles for use in land, sea and air are desirable for a wide range of applications including, without limitation, military and other government sectors, lab testing, and the motion picture industry. Such control systems typically include a robotic or motorized device that manipulates the steering mechanism for the vehicle (e.g., the steering wheel of an automotive vehicle) and a controller device that is operated by a user in a remote location with respect to the vehicle so as to permit remote control and navigation of the vehicle by the user.

Many such navigational control systems are designed for a particular type of vehicle, can be complex and also cumbersome to install and implement for use in a vehicle.

It is desirable to provide a remote navigational control system for unmanned vehicles that is universal and can be easily installed and implemented for use with a variety of different types of vehicles.

SUMMARY

In accordance with an example embodiment of the present invention, an actuation and control system for a steering mechanism of a mobile vehicle comprises a motor including a drive shaft that is rotatable in two opposing directions, a securing structure configured to be secured to the steering mechanism of the mobile vehicle, and a linking structure that couples the motor with the securing structure such that rotational motion of the drive shaft is imparted to the securing structure to facilitate control of the steering mechanism of the mobile vehicle.

In accordance with another example embodiment of the present invention, a remote controlled mobile vehicle comprises a mobile vehicle comprising a compartment including a steering mechanism within the compartment that facilitates navigational control of the mobile vehicle, and an actuation and control system installed within the compartment of the mobile vehicle, where the system comprises a motor including a drive shaft that is rotatable in two opposing directions, a securing structure configured to be secured to the steering mechanism of the mobile vehicle, and a linking structure that couples the motor with the securing structure such that rotational motion of the drive shaft is imparted to the securing structure to facilitate control of the steering mechanism of the mobile vehicle.

In a further example embodiment of the present invention, a method of controlling a steering mechanism for a mobile vehicle comprises connecting a securing structure to the steering mechanism of the mobile vehicle, mounting a motor to the mobile vehicle, the motor including a drive shaft that rotates in two opposing directions, coupling the drive shaft of the motor with the securing structure via a linking structure, and controlling the steering mechanism of the mobile vehicle by controlling operation of the motor such that rotational motion of the drive shaft is imparted to the securing structure and also the steering mechanism of the mobile vehicle.

The actuation and control system is easy to assemble and install in a variety of different types of mobile vehicles, including land, air and sea vehicles. The motor of the system can be mounted at a number of different locations and orientations with respect to the securing structure that connects with the steering mechanism of the mobile vehicle while still permitting translation of the rotational motion of the drive shaft of the motor to the securing structure (which controls movements of the vehicle's steering mechanism).

The above and still further features and advantages of the present invention will become apparent upon consideration of the following detailed description of a specific embodiment thereof, particularly when taken in conjunction with the accompanying drawings wherein like reference numerals in the various figures are utilized to designate like components.

BRIEF DESCRIPTION OF THE DRAWINGS

FIGS. 4A and 4B are side views in elevation of the embodiment of FIG. 1.

DETAILED DESCRIPTION

Figure 1:
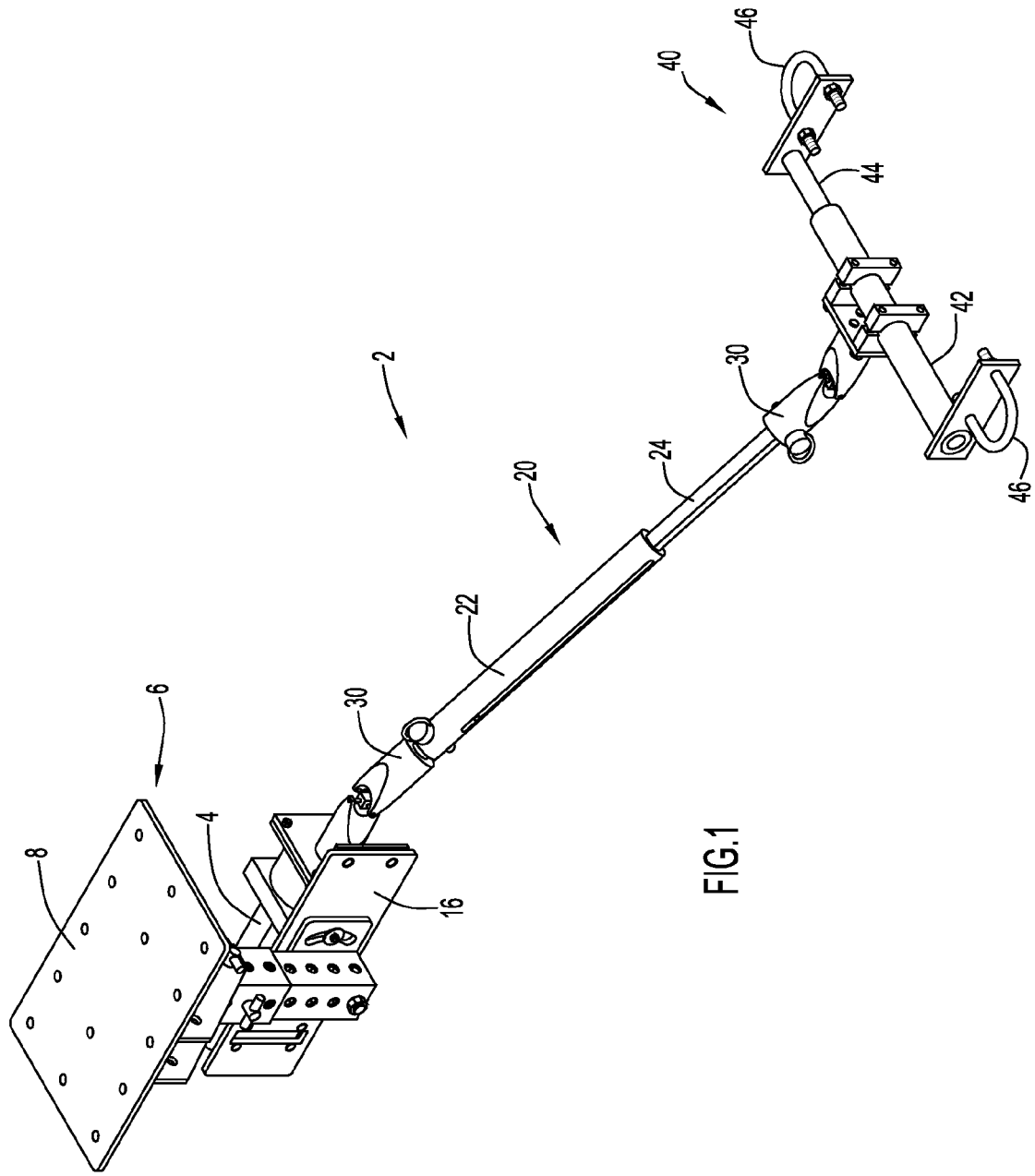
FIG. 1 is a view in perspective of an example embodiment of a steering actuation and control system for a mobile vehicle.
Figure 2:
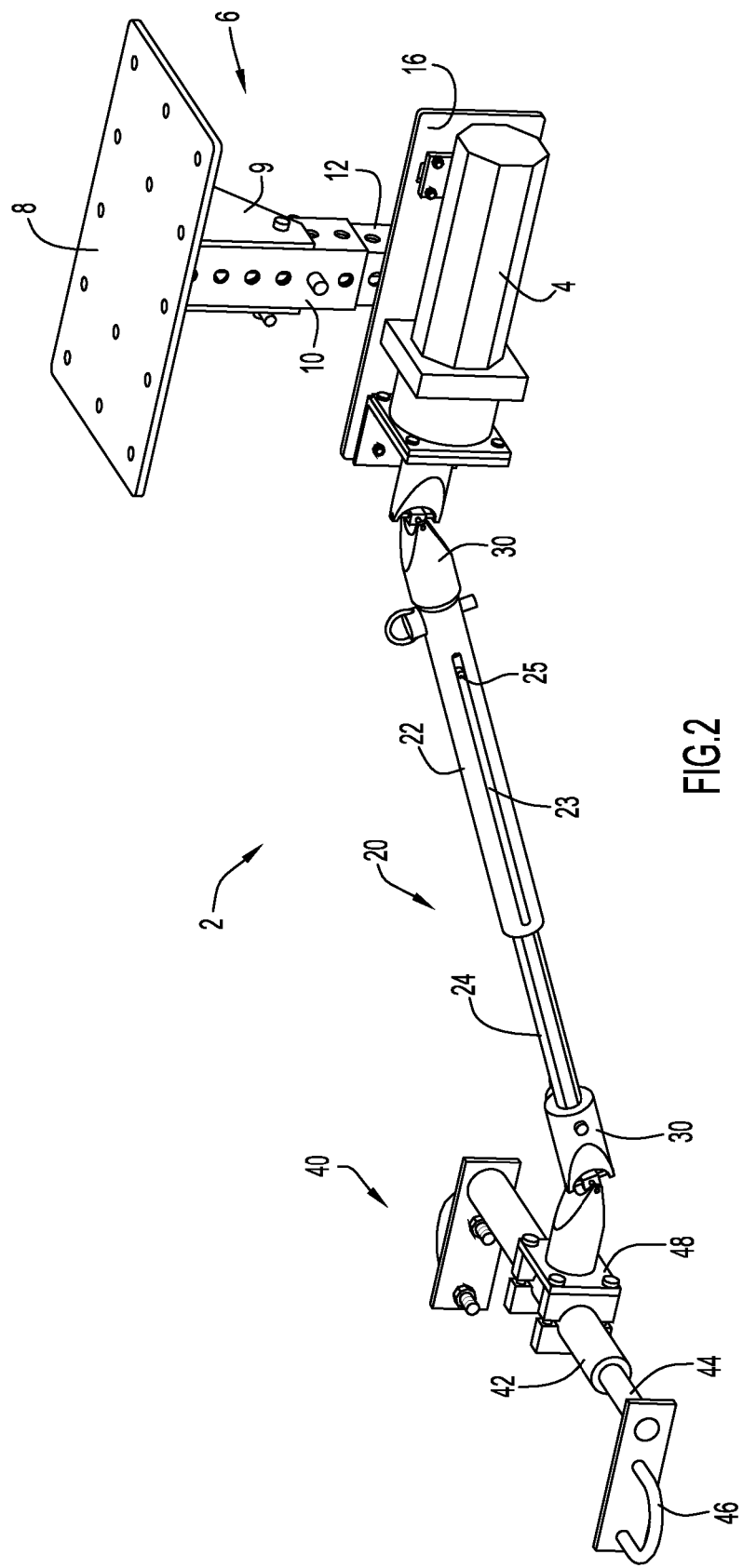
FIG. 2 is another view in perspective of the embodiment of FIG. 1.

In accordance with the present invention, systems and corresponding methods are provided for providing remote actuation and control of steering mechanisms for mobile vehicles. The system can be used to control any mobile vehicle, including mobile vehicles for use on land (e.g., motorized vehicles), in air (e.g., airplanes or other aeronautical vehicles) and/or in sea (e.g., motorized boats, ships, sailing vessels, etc.).

The systems of the invention include a securing structure that is configured to secure to the steering mechanism of the mobile vehicle, a motorized control device that is configured to adjust the steering mechanism of the mobile vehicle to achieve navigation of the vehicle, and suitable linkage structure that couples the motorized control device with the securing structure such that forces applied by the motorized control device are translated to corresponding motions of the steering mechanism which control navigation of the mobile vehicle. Preferably, a remote controller device is also provided to facilitate user control of the motorized control device from a location remote from the mobile vehicle, such that the mobile vehicle can be unmanned during operation (i.e., navigation of the remote vehicle is being indirectly controlled by a user, for example, a user who is at a location remote from the vehicle).

In an example embodiment of the invention depicted in the FIGS. 1-6, an actuation and control system for a mobile vehicle is implemented in a land-based motorized vehicle (e.g., a military vehicle). However, as noted above, the system of the invention is not limited to such a vehicle but can be implemented in a variety of different types of mobile vehicles for land, sea and air transportation.

Referring to FIGS. 1-6, a mobile vehicle steering actuation and control system 2 includes a motorized control device in the form of a motor 4 that is coupled to a securing structure or wheel mount 40 via a suitable linking structure 20. The motor 4 includes a rotational drive shaft 5 (see FIGS. 3A and 3B) that connects with the linking structure 20 to facilitate rotational movements of the wheel mount 40 in the manner described below. The motor, wheel mount, linking structure and other mounting and securing structure of the system can be constructed of any suitable materials including, without limitation, stainless steel, plastics and/or other suitably rigid metals.

Figure 7A:
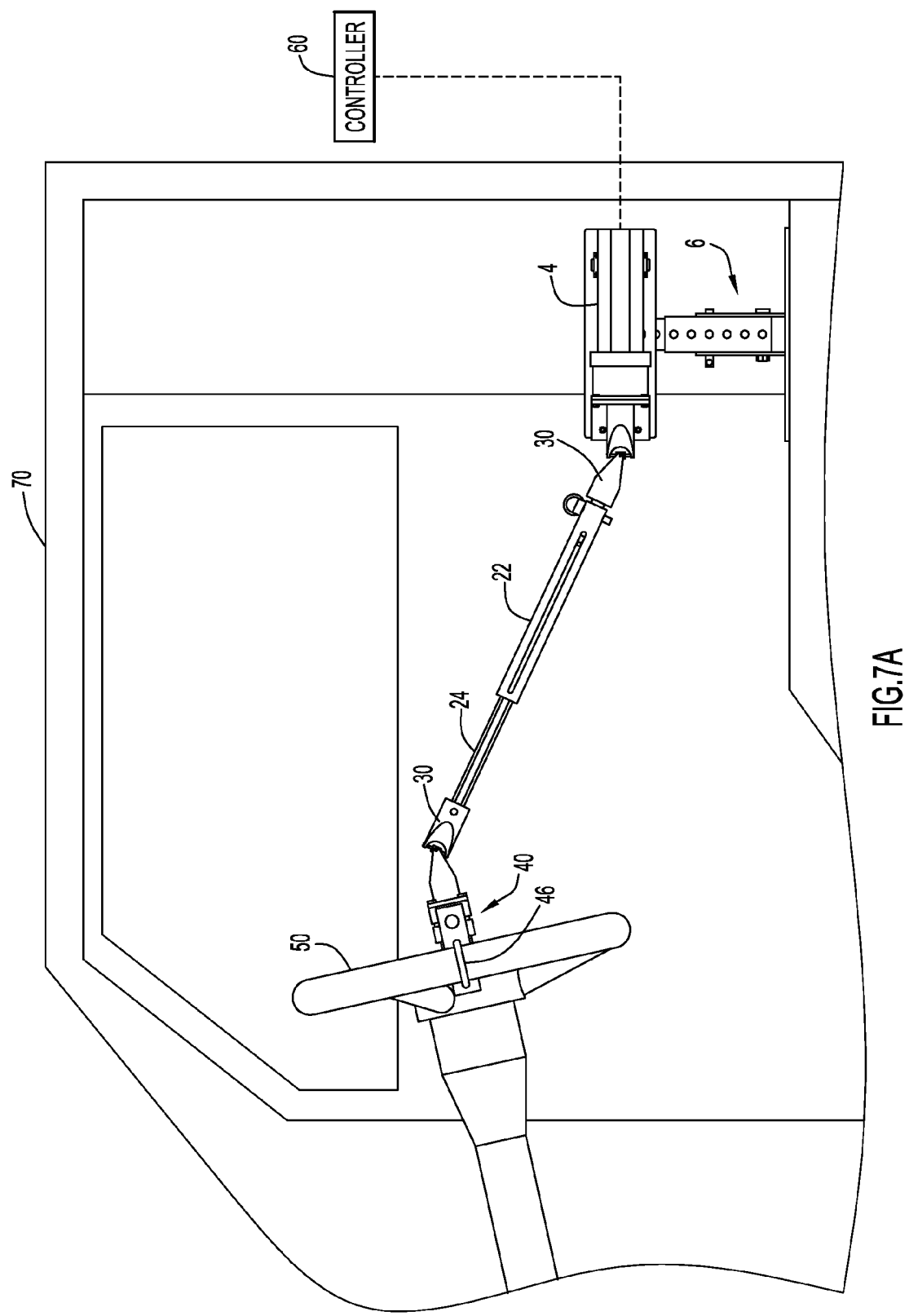
FIGS. 7A and 7B are side views of the system of FIGS. 1-6 installed within a compartment of a motorized land vehicle.
Figure 7B:
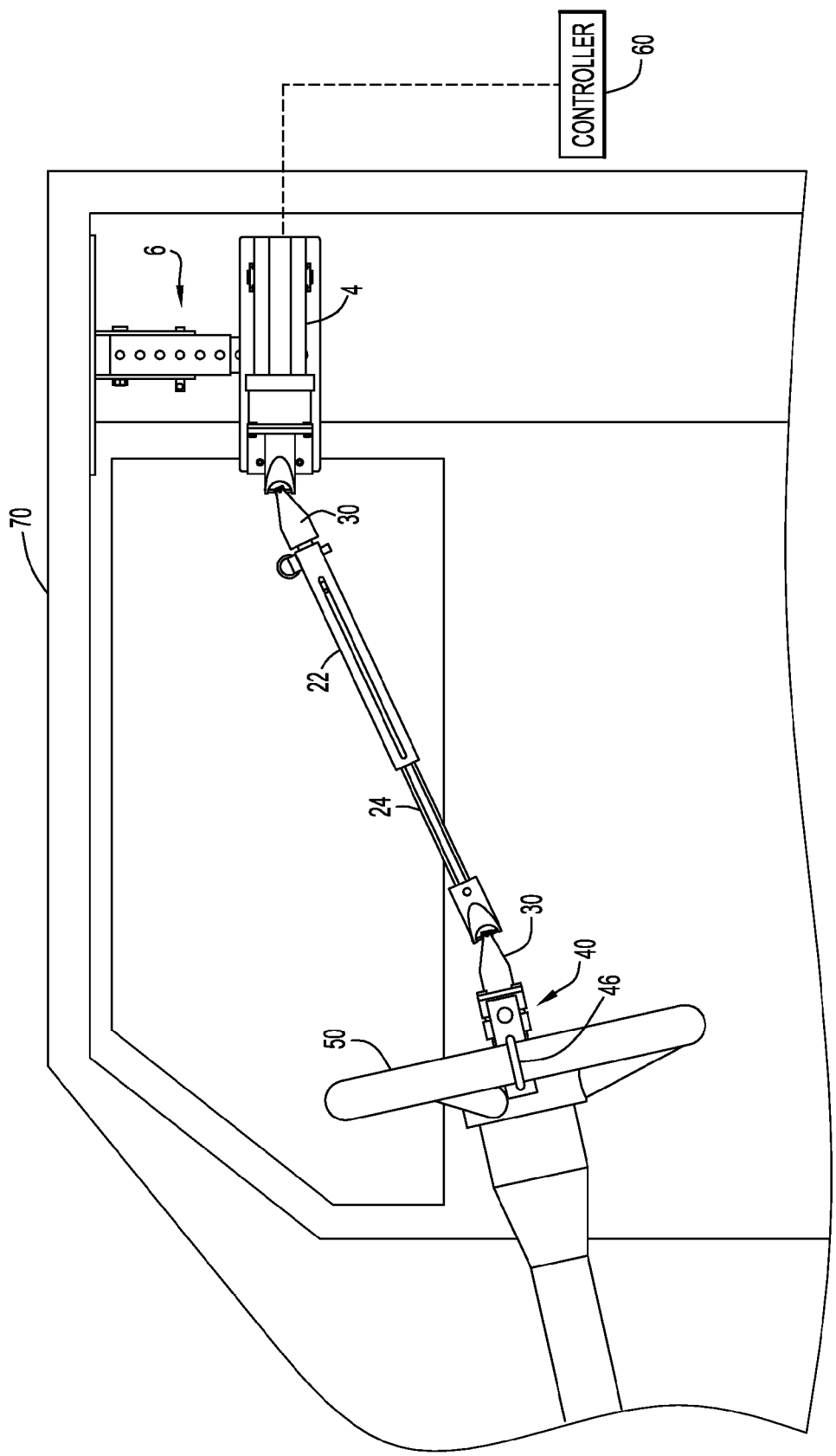

A motor mount 6 connects with the motor 4 and is designed to facilitate mounting of the motor at a number of different locations within the passenger compartment and with respect to the steering wheel of the automotive vehicle (e.g., as shown in FIGS. 7A and 7B). For example, the motor mount 6 can be secured within the passenger compartment at a selected location of the roof or ceiling interior or floor interior of the automotive vehicle. The motor mount 6 includes a generally rectangular mounting plate 8 that secures the entire mount 6 with the motor 4 to a selected surface (e.g., an interior roof surface or interior floor surface) of the vehicle passenger compartment.

Figure 3A:
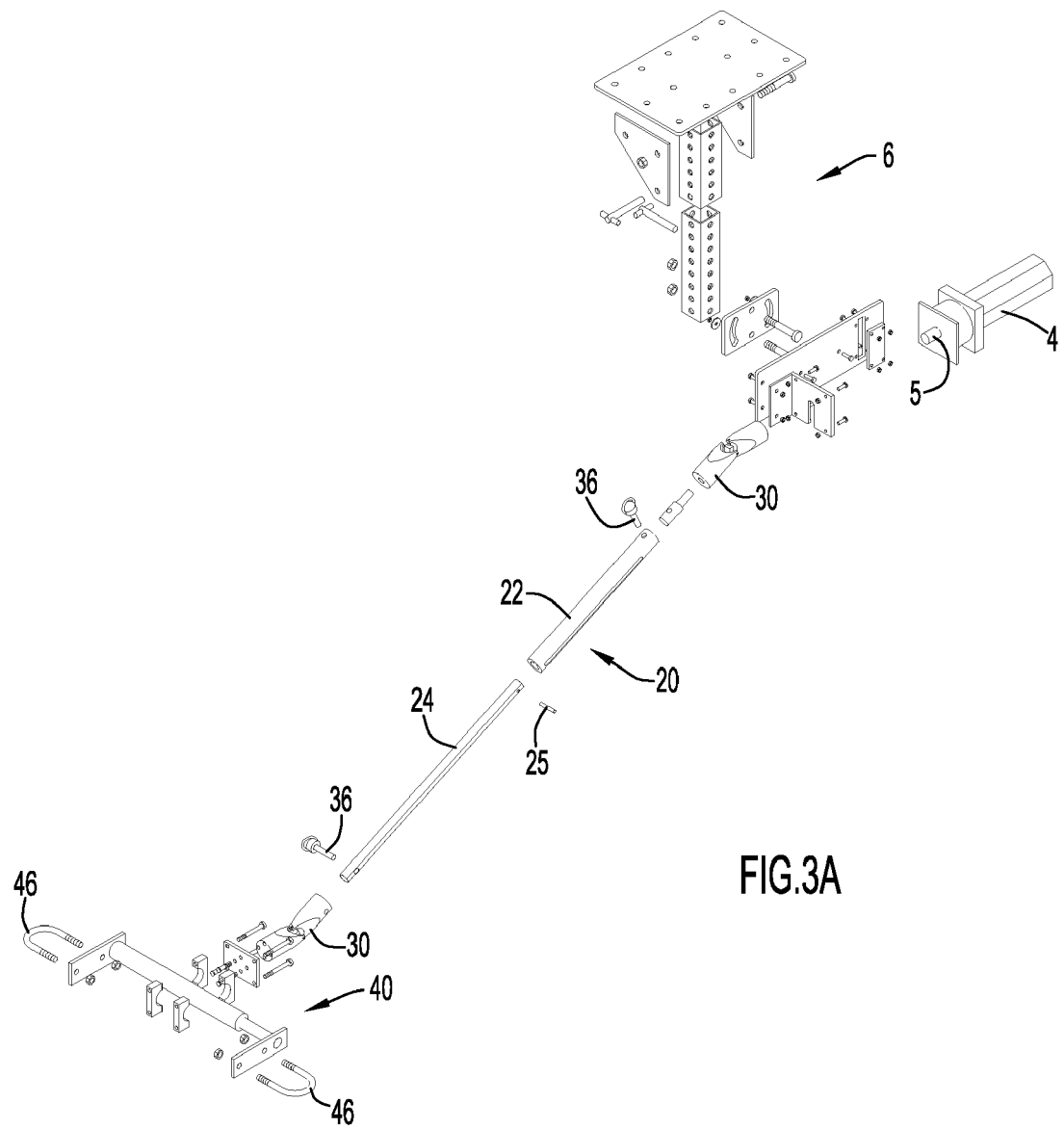
FIG. 3A is an exploded view in perspective of the embodiment of FIG. 1.
Figure 3B:
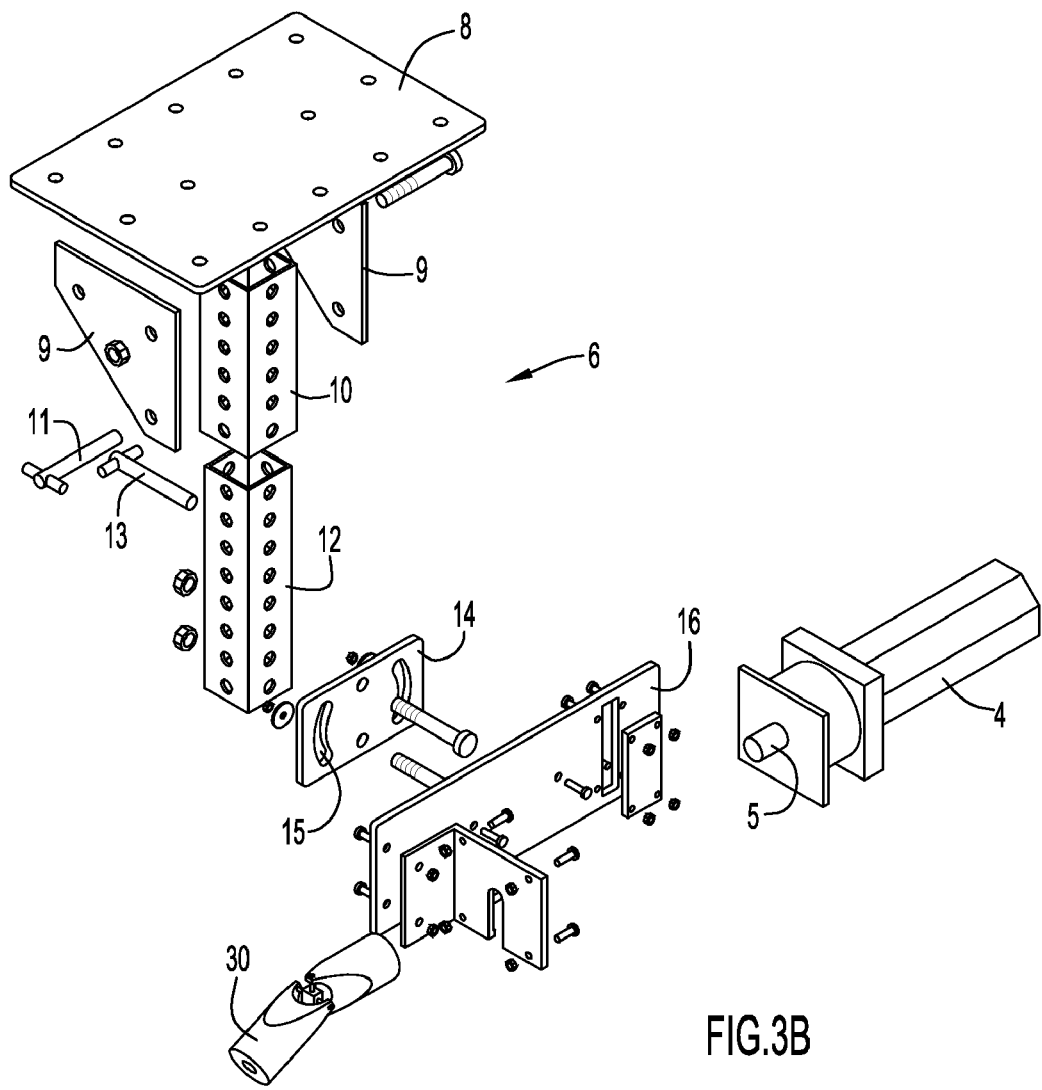
FIG. 3B is an exploded view in perspective of motor mount for the embodiment of FIG. 1.
Figure 3C:
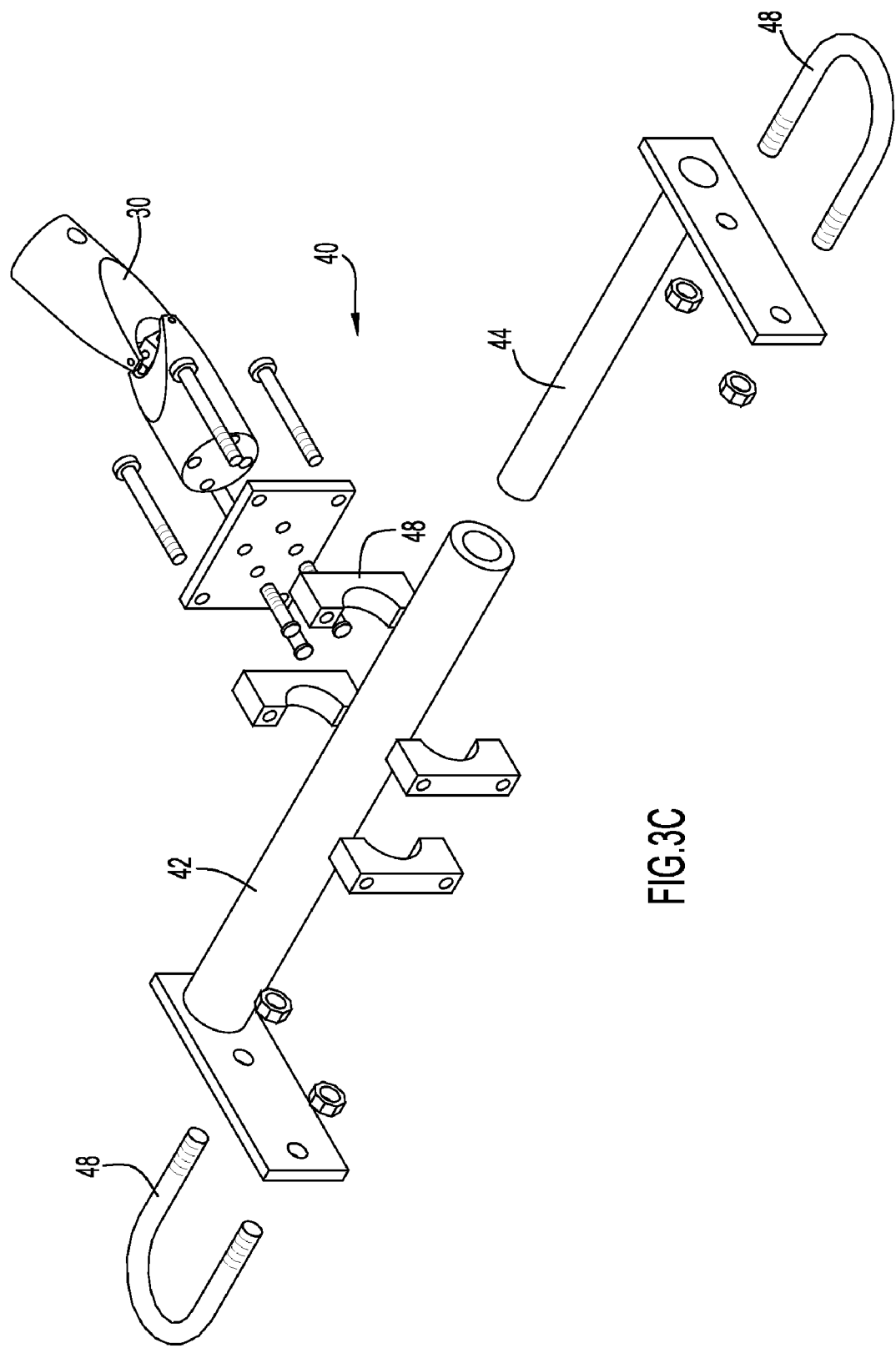
FIG. 3C is an exploded view in perspective of the securing structure for the embodiment of FIG. 1.

A bracket is secured to the mounting plate 8 (e.g., secured via a welded joint or any other suitable manner) and includes a pair of bracket plates 9 separated from each other and extending transversely from mounting plate 8 (see, e.g., FIG. 3B). Each bracket plate 9 includes a plurality of holes extending through the plate and that are arranged in a linear pattern in a direction transverse the plate 8 and in correspondence with the holes of the other bracket plate 9. A hollow channel bar 10 having a rectangular or square shaped cross-section has a width dimension that permits the channel bar 10 to fit within a gap between bracket plates 9, preferably in a snug or friction-fit relationship with the bracket plates 9. The channel bar 10 is arranged within the gap between bracket plates 9 such that the channel bar 10 extends in a lengthwise direction away from the mounting plate 8. The channel bar 10 further includes a plurality of holes extending through at least two opposing sides of the channel bar 10 and that are arranged in a pattern extending the length of the channel bar 10 along the two opposing sides such that each hole on one side of the channel bar 10 is aligned with a corresponding hole on the opposing side of the channel bar 10. When the channel bar 10 is placed within the gap between bracket plates 9 and selected holes of the channel bar 10 are aligned with holes of the bracket plates 9, a pin 11 is inserted through the holes to releasably lock the channel bar 10 with respect to the bracket plates 9.

A second hollow channel bar 12 having a configuration substantially similar to the first channel bar 10 (including a generally square or rectangular cross-section with a plurality of holes extending through at least two opposing sides of the channel bar 12 and that are arranged in a pattern extending the length of the channel bar 12 along the two opposing sides) but with a slightly smaller transverse cross-sectional dimension is fit within the hollow interior of the first channel bar 10 such that the second hollow channel bar 12 is telescopically and slidably movable within the first channel bar 10 (see FIG. 3B). A pin 13 in inserted through corresponding holes on each of the channel bars 10, 12 to releasably secure the channel bars together. This configuration permits the channel bar 12 to be releasably locked or connected with the channel bar 10 in a variety of different telescopic positions such that the channel bar 12 can be adjusted to extend at a variety of different distances from mounting plate 8 (e.g., where the distance is measured between the mounting plate and an end of the channel bar 12 that is furthest from the mounting plate).

A second mounting plate 14 has a generally rectangular configuration and is secured to an exposed portion of channel bar 12 (i.e., the portion of channel bar 12 that is not received within channel bar 10). The second mounting plate 14 further includes a pair of curved or arcuate shaped slots 15 that are separated from each other and that are disposed near opposing ends of the plate 14. A generally rectangular motor engaging plate 16 is secured to the second mounting plate 14 using suitable securing structure (e.g., pins and/or bolts as shown in the exploded view of FIG. 3B) that extend through the arcuate shaped slots 15 of plate 14. The motor 4 is secured directly to motor engaging plate 16 via suitable securing structure (e.g., using suitable welding joints and/or clamping structure such as the bracket and screw connected with plate 16 as shown in the exploded view of FIG. 3B).

The arcuate shaped slot configuration for the second mounting plate 14 permits the motor engaging plate 16 and thus the motor 4 to be mounted at a variety of different selected orientations with respect to the interior surface of the passenger compartment of the vehicle. In addition, the telescoping connection between channel bars 10, 12 permits the mounting of the motor 4 at a variety of selected distances from the interior surface of the passenger compartment. Thus, the motor mount 6 provides a mounting structure to secure the motor 6 at a variety of different orientations and elevations within the passenger compartment, which facilitates a variety of different applications in which the system can be used (e.g., used in a variety of different types and makes of mobile vehicles). It is noted, however, that any other suitable mounting structure that facilitates mounting of the motor at different orientations and distances from one or more surfaces of a mobile vehicle can be utilized in accordance with the present invention.

The linking structure 20 includes a generally cylindrical and hollow outer tube 22 and a rod 24 that is suitably dimensioned to be telescopically received within and slidably movable with respect to an end of the outer tube 22 (see, e.g., FIGS. 1, 2, 4A and 4B). The tube 22 includes a slot 23 that extends in a lengthwise direction a selected distance between the ends of the tube (without reaching the tube ends). The slot 23 is depicted in the figures as extending through the wall thickness of tube 22. However, it is noted that the slot can extend only partially into an interior wall surface portion of the tube. The rod 24 includes at least one protrusion 25 that extends transversely from the rod and is suitably dimensioned to be received within the slot 23 when rod 24 is received within tube 22. This configuration permits telescopic and slidable movement of rod 24 with respect to tube 22 during operation of the system, while any rotational movement of the tube 22 about its central axis results in corresponding rotational movement of the rod 24 (due to the torque applied to protrusion 25 by the rotary movement of tube 22). In other words, the rod 24 and 22 are substantially prevented from rotating independently of one another due to the protrusion 25 being secured within slot 23. In the embodiment of FIGS. 1-6, it can be seen that the protrusion 25 is disposed in close proximity to the end of rod 24 that opposes the end that connects with the wheel mount 40. This configuration permits the furthest possible extension of rod 24 from tube 22 prior to the protrusion 25 abutting an end of slot 23. However, one or more protrusions can also be provided at different locations along the lengthwise dimension of the rod.

Figure 5A:
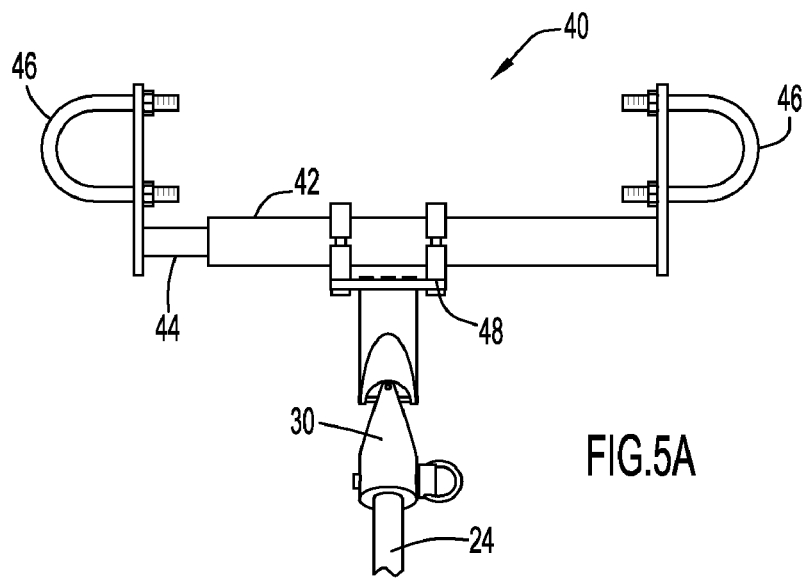
FIGS. 5A and 5B are views in elevation of the steering wheel mount for the embodiment of FIG. 1.
Figure 5B:
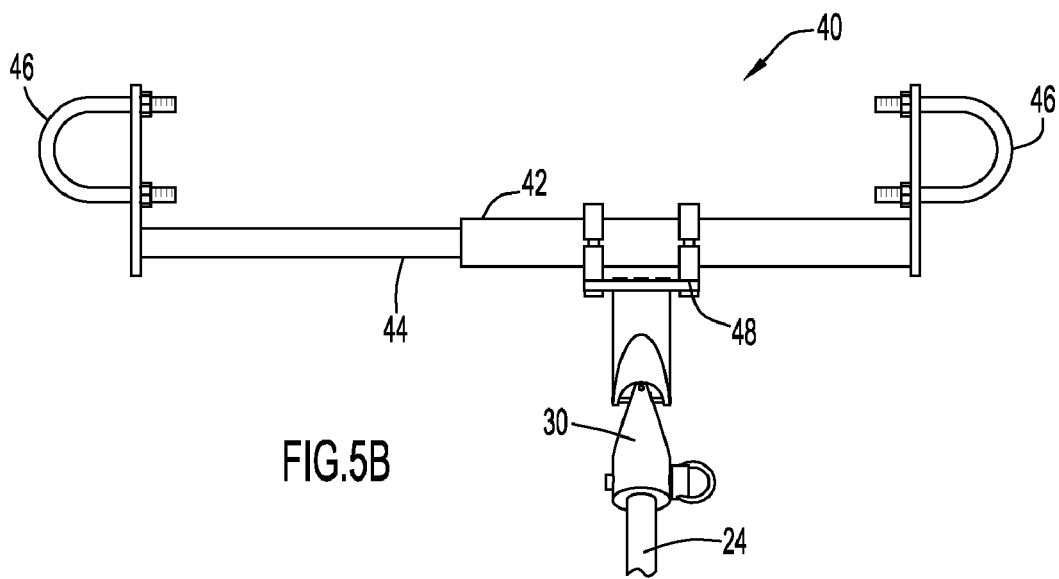
Figure 6:
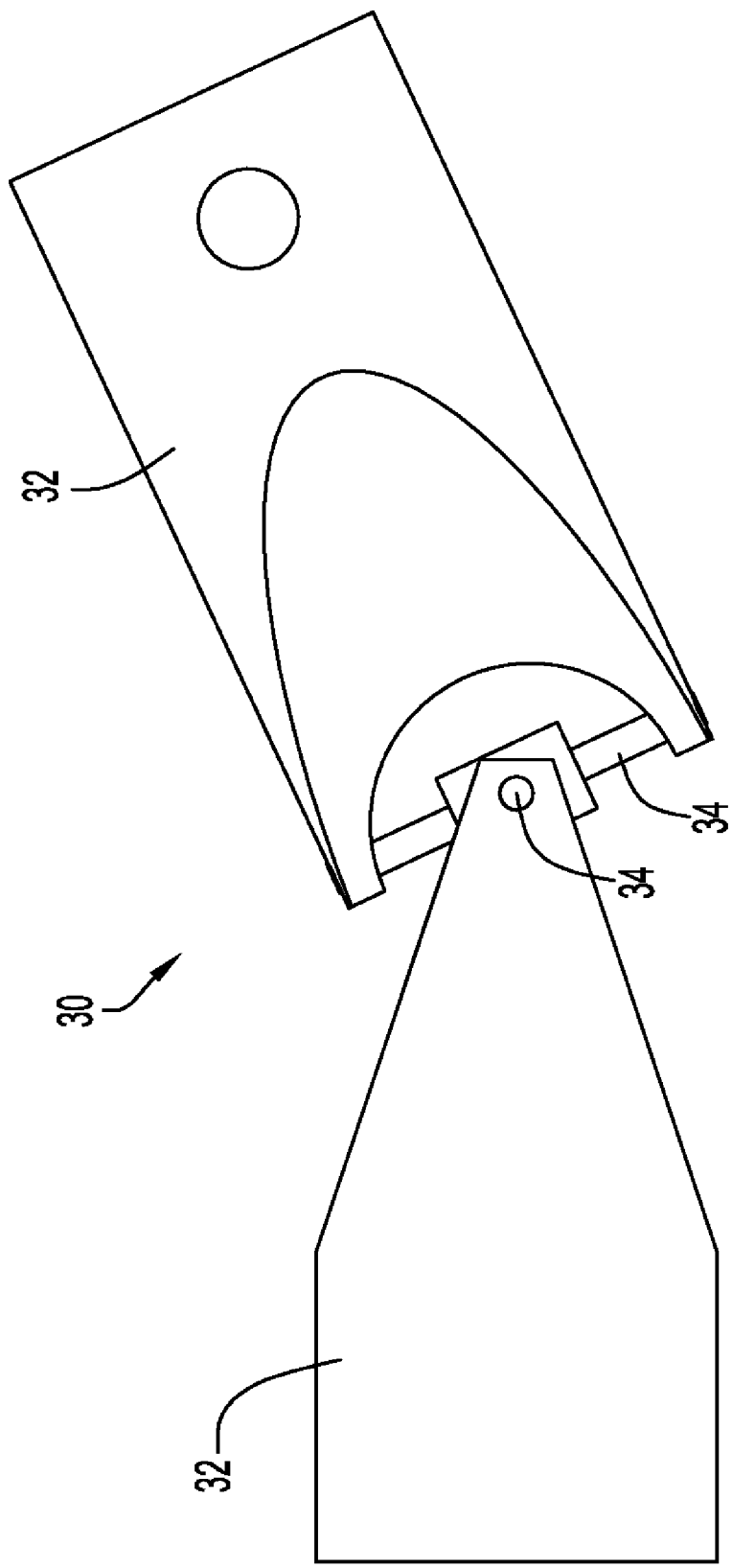
FIG. 6 is a side view in partial cross-section of a Universal joint for the embodiment of FIG. 1.

The securing structure can be any structure configured to connect with the linking structure 20 and the steering mechanism for a mobile vehicle such that rotary motion of the linking structure 20 is translated to the steering mechanism. In the example embodiment of the figures (see FIGS. 1, 2, 3A, 3C, 5A and 5B), the securing structure is configured as a wheel mount 40 that can be secured to a conventional or other type of steering wheel of a motorized land vehicle such as an automobile (e.g., a generally circular shaped steering wheel 50 for a mobile vehicle 70 as shown in FIGS. 7A and 7B). The securing structure 40 includes an outer, hollow tube 42 and an inner rod 44 that is received within and telescopically and slidably movable with respect to the outer tube 42. The longitudinal ends of the securing structure 40, defined at a free end of tube 42 and a free end of inner rod 44, include engaging structure 46 in the form of U-shaped clamps which are securable around opposing portions of the steering wheel of the mobile vehicle, where the inner rod 44 can move telescopically with respect to outer tube 42 (as shown in FIGS. 5A and 5B) to provide an adjustable length for the wheel mount 40 such that the engaging structure 46 defined at its ends can suitably engage with steering wheels having a variety of different shapes and sizes. A clamp 48 connects the engaging structure 46, via its outer tube 42, to the linking structure 20.

Each of the longitudinal ends of the linking structure 20 connects with the motor 4 and the securing structure 40 via a Universal joint 30. A Universal joint, also referred to as a U-joint, is defined as a joint secured to an elongated member (e.g., a tube or rod) and/or any other rigid member that allows the elongated member to rotate, move or "bend" in a plurality of different directions with respect to another member to which the elongated member is secured. The U-joint typically includes a pair of hinge members located in close proximity and oriented transversely (e.g., at about 90°) with respect to each other, where the hinge members are connected by a cross shaft. In the embodiment shown in the figures (see, e.g., FIG. 6, which depicts a universal joint 30 in isolation), each U-joint 30 includes two members 32 that are attached to each other via hinge pins 34. Each U-joint member 32 rotates or pivots with respect to the hinge pin 34 to which it is connected, and the hinge pins are aligned at an angle of about 90° with respect to each other. The two hinge pins 34 are secured together in their orientation with each other at a central location of the U-joint 30.

Each of the U-joints 30 are secured at one end to either the drive shaft of motor 4 or the outer tube clamping structure 48 of the wheel mount 40, while the free end of each U-joint 30 releasably connects with a corresponding end of the linking structure 20. In particular, the free end of the first U-joint member 32 connects with the free end of the linking structure outer tube 22 via a removable pin 36 that extends through openings in the tube 22 and corresponding openings extending through a free end section of U-joint member 32. Similarly, the free end of the second U-joint member 32 connects with the free end of the linking structure rod 24 via a removable pin 36 that extends through openings in the free end section of U-joint member 32 and a corresponding bore extending through the rod 24.

The U-joint configuration facilitates use of the system with a variety of different mobile vehicle configurations, where the motor 4 can be mounted in a number of different locations that will still allow the linking structure 20 to connect the motor 4 with the securing structure 40 so as to control the steering structure for the mobile vehicle. FIGS. 7A and 7B show just a couple of examples of how the system 2 can be connected with a steering wheel 50 of a motorized vehicle 70. It is to be understood, however, that many other configurations are also possible. As can be seen in FIG. 7A, the system 2 is configured such that the motor 4 is secured with mounting structure 6 within the passenger compartment of vehicle 70 at an elevation that is generally lower than the steering wheel 50 (e.g., the mounting structure 6 connects with an interior floor surface of the passenger compartment). As shown in FIG. 7B, the system 2 is configured such that the motor 4 is secured with mounting structure 6 within the passenger compartment of the vehicle 70 at a generally higher elevation in relation to the steering wheel 50 (e.g., the mounting structure 6 connects with an interior ceiling surface of the passenger compartment). The system can also be configured such that the motor 4 is secured at about the same elevation as the steering wheel 50.

The motor 4 is configured to rotate its drive shaft in both clockwise and counterclockwise rotational directions, such that rotational movement of the drive shaft is translated through the first U-joint 30 to linking structure 20, and then from linking structure 20 through the second U-joint 30 to the wheel mount 40. This rotational movement is imparted from the wheel mount 40 to the steering wheel 50 (or other steering mechanism of the mobile vehicle) to which it is secured. Thus, a small rotational movement in either direction by the motor drive shaft imparts a corresponding rotation of the steering structure to achieve navigational movements of the motorized vehicle.

Any conventional or other suitable type of motor can be provided that is capable of actuation of its drive shaft in two opposing rotational directions. The motor is preferably configured for remote operation by a user such that the motorized vehicle can be operated via unmanned navigation. Alternatively, the motor can be provided with a controller capable of controlling operation of the motor based upon control software and/or via user input. In an example embodiment, the motor is an electric motor including a suitable control system integrated with the motor to facilitate remote operation of the motor by a user, where control signals are sent by the user to the motor controller via a suitable wireless communication link Examples of a suitable motor with integrated control system include, without limitation, servo motors that are commercially available under the trademark SmartMotor from Animatics Corporation (California, USA).

A controller 60 is schematically depicted in FIGS. 7A and 7B, with a wireless communication link (shown by the dashed line) between the controller 60 and motor 4 which facilitates the transmission of command signals to achieve operator control of the motor 4, via the controller 60, from a location that is remote from the mobile vehicle 70 in which system 2 is installed. The controller 60 can be any suitable type of remote control device that enables control of motor operation, including precise rotational movements of the motor drive shaft that translate into corresponding precise movements of the steering wheel or other steering mechanism of the mobile vehicle. It is to be understood that the motor 4 also includes a local controller that is hardwired to the motor 4 and is also in communication with the controller 60 via the wireless link in order to receive control commands from the remote controller 60 to facilitate direct control of the motor.

Installation and operation of the actuation and control system 2 with a mobile vehicle is now described with reference to the figures. As shown in FIGS. 7A and 7B, the system 2 can be easily installed in a land-based motorized vehicle 70 (such as a military vehicle). For ease of illustration, only a portion of the motorized vehicle 70 is depicted, including the passenger section or compartment of the vehicle. As used herein, the term "compartment" in relation to a mobile vehicle refers to an enclosed, partially enclosed or open structure or portion of the mobile vehicle that typically includes one or more passenger seats or other passenger carrier sections to facilitate passenger operation of the steering wheel and other control features of the vehicle. In the example embodiment depicted in FIG. 7A, the system 2 is installed such that the motor 4 is mounted (via mounting structure 6) to a floor surface within the passenger compartment of the vehicle 70, where the motor 4 is at a lower elevation in relation to the steering wheel 50. In the example embodiment depicted in FIG. 7B, the system 2 is installed such that the motor 4 is mounted (via mounting structure 6) to an upper or ceiling surface within the passenger compartment of the vehicle 70, where the motor 4 is at a higher elevation in relation to the steering wheel 50.

Installation of the system 2 is relatively simple and easy. The motor mount 6 is installed at a suitable surface location within the passenger compartment of the vehicle 70 (e.g., floor or ceiling surface as shown in FIGS. 7A and 7B). The motor can be adjusted at any suitable distance from and with any suitable angular orientation with respect to the mounting plate 8 by adjusting channel bar 12 with respect to channel bar 10 and also the orientation of plate 16 with respect to plate 14 using the connecting structure as described above. The wheel mount 40 is connected to steering wheel 50 by connecting engaging structure 46 at opposing ends of the steering wheel 50. The linking structure 20 is easily connected to U-joints 30 by connecting one of the tube 22 and rod 24 to its corresponding U-joint member 32 via pin 36 and then extending (as necessary) the linking structure (via the telescopic and sliding engagement between outer tube 22 and inner rod 24) such that the other of the tube 22 and the rod 24 can connect to its corresponding U-joint member 32 via pin 36.

The motor can be electrically powered by a battery or any other suitable power source including, without limitation, a power distribution unit disposed within the vehicle that provides electrical power to the motor and other control systems for the unmanned and remote operated vehicle.

During operation in which the vehicle 70 is navigated by remote operation, the drive shaft of motor 4 is rotated a precise amount in different directions to achieve corresponding rotation of the steering wheel 50 to a selected degree in different directions. The steering wheel 50 is connected in a conventional or any other suitable manner to the steering/navigational system of the vehicle 70. In an example in which an operator provides input to a controller that controls precise rotation of the motor drive shaft (e.g., using controller 60 as depicted in FIGS. 7A and 7B), the operator can control navigation of the vehicle by visual observation of the travel path for the vehicle (e.g., when the user is within viewing distance of the vehicle). Alternatively, a visual display of the travel path of the vehicle in forward and/or reverse directions can be provided to the operator via data signals transmitted by one or more cameras mounted at suitable locations on the vehicle. Such a visual display can be provided, for example, on the controller device or any other visual display device viewed by the operator.

The mobile vehicle steering actuation and control system 2 can be easily removed from vehicle 70 after use and implemented for use with other vehicles. The wheel mount 40 provides a quick-release attachment with most conventional and other types of steering wheels or other steering mechanisms for mobile vehicles. In addition, the linking structure 20 can be easily secured and separated from the wheel mount 40 and motor 4 during assembly and disassembly. The adjustability and easy assembly/removal features that are achieved with the motor mount 6, the U-joints 30 and the lengthwise adjustability of the linking structure 20 render the system 2 capable of universal use with a variety of different types of mobile vehicles, including different makes and models of land-based motorized vehicles as well as mobile vehicles for use in air and in water.

The U-joints 30 allow for a variety of offsets between the motor 4 and the steering mechanism (e.g., a variety of offset distances between the motor drive shaft and the linking structure 20 as well as a variety of offset angles between the motor drive shaft and the linking structure 20 by as much as 30°) while maintaining effective operability of the system 2. In addition, the adjustable length of the securing structure 20 compensates for non-aligned and non-centered mounting of the securing structure 40 with a steering wheel or other steering structure of the mobile vehicle. For example, the securing structure 20 permits sliding, telescopic movement of the rod 24 with respect to the tube 22 during controlled navigational or steering operations of the steering wheel (or other steering structure) in scenarios when components of the system (such as the motor 4 and/or securing structure 20) are not in perfect alignment with the rotational axis of the steering wheel. In a non-limiting example, the linking structure 20 can vary in length a distance from about 1.5 feet (about 45.7 cm) to about 2.5 feet (about 76.2 cm).

It will be appreciated that the embodiments described above and illustrated in the drawings represent only a few of the many ways of implementing a system and corresponding method for universal actuation and control of steering mechanisms for unmanned mobile vehicles.

Any suitable types of securing structure can be provided for mounting the motorized controller at adjustable elevations and orientations with respect to some surface portion of the mobile vehicle. In addition, the motorized controller can have any suitable configuration. For example, the motorized controller can be configured simply as an electric motor with a drive shaft that changes rotational directions based upon simple control by the user. Alternatively, the motorized controller can include any selected type of controller or processor that facilitates a higher, more sophisticated and precise level of motor control. In addition, any suitable type or types of remote control wireless communication links and associated hardware and software can be provided to achieve remote control of the motorized controller by a user located at a remote location from the mobile vehicle.

The linking structure between the motorized controller and the wheel mount can be any suitable structure that preferably has an adjustable length and that is capable of imparting the rotational forces imparted by the drive shaft of the motor to the wheel mount. Any suitable number and types of U-joints can also be provided to facilitate mounting the motorized controller at a variety of orientations and elevations with respect to the mobile vehicle steering mechanism while still permitting translation of the drive shaft rotary motion to the steering mechanism.

The wheel mount can have any suitable configuration and design to render the wheel mount suitable for attachment to a variety of different types and sizes of steering wheels and/or other types of steering mechanisms for a mobile vehicle, in which the steering mechanism is operable by rotation of the steering mechanism about an axis extending through some portion of the steering mechanism.

Having described example embodiments of systems and methods that provide universal actuation and control of steering mechanisms for mobile vehicles, variations and changes will be suggested to those skilled in the art in view of the teachings set forth herein. It is therefore to be understood that all such variations, modifications and changes are believed to fall within the scope of the present invention as defined by the appended claims.

What is claimed:

1. An actuation and control system for a steering mechanism of a mobile vehicle, the system comprising:
 a motor including a drive shaft that is rotatable in two opposing directions;
 a securing structure configured to be secured to the steering mechanism of the mobile vehicle, wherein the securing structure comprises a first elongated member slidably movable within a portion of a second elongated member to facilitate adjusting a lengthwise dimension of the securing structure so as to further facilitate attachment of the securing structure at different side locations of the steering mechanism; and
 a linking structure that couples the motor with the securing structure such that rotational motion of the drive shaft is imparted to the securing structure to facilitate control of the steering mechanism of the mobile vehicle.

2. The system of claim 1, further comprising:
 a motor mount that is configured to mount the motor at a plurality of different elevations with respect to the securing structure while rotational motion of the drive shaft is imparted to the securing structure via the linking structure during system operation.

3. The system of claim 2, wherein the motor mount secures the motor to a surface within a compartment of the mobile vehicle that includes the steering mechanism, wherein the motor mount is adjustable to facilitate mounting the motor at a plurality of distances and orientations with respect to the compartment surface of the mobile vehicle.

4. The system of claim 1, wherein the steering mechanism of the mobile vehicle comprises a steering wheel, and the first and second elongated members of the securing structure connect at opposing side locations of the steering wheel.

5. An actuation and control system for a steering mechanism of a mobile vehicle, the system comprising:
 a motor including a drive shaft that is rotatable in two opposing directions;
 a securing structure configured to be secured to the steering mechanism of the mobile vehicle; and
 a linking structure that couples the motor with the securing structure such that rotational motion of the drive shaft is imparted to the securing structure to facilitate control of the steering mechanism of the mobile vehicle, wherein the linking structure comprises a hollow tubular member and an elongated member slidably received within the tubular member, the elongated member includes a protrusion that extends transversely from a lengthwise direction of the elongated member, and the tubular member includes a slot extending in a lengthwise direction of the tubular member that receives the protrusion when the elongated member is received within the tubular member such that rotation of one of the elongated member and the tubular member imparts a corresponding rotation to the other of the elongated member and the tubular member.

6. The system of claim 1, wherein a free end of the linking structure is coupled with the drive shaft of the motor via a Universal joint that facilitates rotation of the linking structure at a plurality of different angles with respect to the drive shaft.

7. The system of claim 1, wherein a free end of the linking structure is coupled with the securing structure via a Universal joint that facilitates rotation of the linking structure at a plurality of different angles with respect to the securing structure.

8. The system of claim 1, further comprising:
 a remote control device in communication with the motor to facilitate rotation of the drive shaft in different directions by a user of the remote control device so as to achieve navigational control of the mobile vehicle.

9. A remote controlled mobile vehicle, comprising:
 a mobile vehicle comprising a compartment including a steering mechanism within the compartment that facilitates navigational control of the mobile vehicle; and
 the system of claim 1 installed within the compartment of the mobile vehicle.

10. The mobile vehicle of claim 9, wherein the mobile vehicle comprises a land-based motorized vehicle, and the steering mechanism comprises a steering wheel to which the securing mechanism of the system is secured.

11. The mobile vehicle of claim 9, further comprising:
 a remote control device in communication with the motor of the system to facilitate rotation of the drive shaft in different directions by a user of the remote control device so as to achieve navigational control of the mobile vehicle.

12. A method of controlling a steering mechanism for a mobile vehicle, the method comprising:
 connecting a securing structure to the steering mechanism of the mobile vehicle, wherein the securing structure comprises a first elongated member slidably movable within a portion of a second elongated member to facilitate adjusting a lengthwise dimension of the securing structure so as to facilitate attachment of the securing structure at different side locations of the steering mechanism;
 mounting a motor to the mobile vehicle, the motor including a drive shaft that rotates in two opposing directions;
 coupling the drive shaft of the motor with the securing structure via a linking structure; and
 controlling the steering mechanism of the mobile vehicle by controlling operation of the motor, wherein rotational motion of the drive shaft is imparted to the securing structure and also the steering mechanism of the mobile vehicle.

13. The method of claim 12, wherein the motor includes a motor mount that is configured to mount the motor at a plurality of different elevations with respect to the securing structure while permitting rotational motion of the drive shaft to be imparted to the securing structure via the linking structure.

14. The method of claim 12, wherein the steering mechanism of the mobile vehicle comprises a steering wheel, and the first and second elongated members of the securing structure are connected to the steering wheel at opposing side locations of the steering wheel.

15. The method of claim 12, wherein the linking structure comprises a hollow tubular member and an elongated member slidably received within the tubular member, the elongated member includes a protrusion that extends transversely from a lengthwise direction of the elongated member, and the tubular member includes a slot extending in a lengthwise direction of the tubular member that receives the protrusion when the elongated member is received within the tubular member such that rotation of one of the elongated member and the tubular member imparts a corresponding rotation to the other of the elongated member and the tubular member.

16. The method of claim 12, wherein a free end of the linking structure is coupled with the drive shaft of the motor via a Universal joint that facilitates rotation of the linking structure at a plurality of different angles with respect to the drive shaft.

17. The method of claim 12, wherein a free end of the linking structure is coupled with the securing structure via a Universal joint that facilitates rotation of the linking structure at a plurality of different angles with respect to the securing structure.

18. The method of claim 12, wherein operation of the motor is controlled by a remote control device in communication with the motor to facilitate rotation of the drive shaft in different directions by a user of the remote control device.

19. An actuation and control system for a steering mechanism of a mobile vehicle, the system comprising:
   a motor including a drive shaft that is rotatable in two opposing directions;
   a securing structure configured to be secured to the steering mechanism of the mobile vehicle; and
   a linking structure that couples the motor with the securing structure such that rotational motion of the drive shaft is imparted to the securing structure to facilitate control of the steering mechanism of the mobile vehicle, wherein the linking structure comprises a hollow tubular member and an elongated member slidably received within the hollow tubular member, and the elongated member and hollow tubular member include a configuration comprising a protrusion and a slot in which the protrusion is received within the slot such that rotation of one of the elongated member and the tubular member imparts a corresponding rotation to the other of the elongated member and the tubular member.

* * * * *